United States Patent [19]
Brink et al.

[11] Patent Number: 5,148,406
[45] Date of Patent: Sep. 15, 1992

[54] METHOD FOR SIMULTANEOUS COLLECTION OF SEISMIC DATA FROM SHALLOW AND DEEP TARGETS

[75] Inventors: Munday Brink, Drammen; Jan Gateman, Lysaker, both of Norway

[73] Assignee: Geco A.S., Stavanger, Norway

[21] Appl. No.: 528,213

[22] Filed: May 25, 1990

[30] Foreign Application Priority Data

May 31, 1989 [NO] Norway ................. 892209

[51] Int. Cl.$^5$ ............... G01Y 1/24; G01Y 1/38
[52] U.S. Cl. ........................... 367/22; 367/20; 367/49; 364/421
[58] Field of Search ............ 367/15, 20, 22, 49, 367/62; 364/421, 223.9, 924.5

[56] References Cited

U.S. PATENT DOCUMENTS

| | | | |
|---|---|---|---|
| 3,436,722 | 4/1969 | Strange | 367/22 |
| 3,441,902 | 4/1969 | Savit | 367/15 |
| 3,613,071 | 10/1971 | Quay | 367/15 |
| 4,020,447 | 4/1977 | Michon et al. | 367/20 |
| 4,101,866 | 7/1978 | Ruehle | 367/22 |
| 4,319,347 | 3/1982 | Savit | 367/60 |
| 4,937,793 | 6/1990 | Shuck et al. | 367/20 |

FOREIGN PATENT DOCUMENTS

| | | | |
|---|---|---|---|
| 1458272 | 10/1966 | France | 367/20 |
| 940095 | 6/1982 | U.S.S.R. | |

OTHER PUBLICATIONS

Brink, M; "Application of Vertical Receiver Arrays .."; 58th Annu. S & G Conf., Nov., 1988, pp. 460–463; abstract provided.

Brink et al; "Marine Seismic Exploration ... Downtime"; 57th Annu. S & G Conf., Oct., 1987, pp. 84–87; abst. only provided.

Brink et al; "Marine Seismic Exploration ... Bad Weather"; 49th European Ass. Exp. Geo. Mtg., Jun., 1987, pp. 4–5; abst. only provided.

Brink et al.; "Marine Acquisition ... Deep Targets"; 59th Annu. S & G Int. Mtg., Nov., 1989, pp. 405–407; abst. only provided.

Primary Examiner—Nelson Moskowitz
Attorney, Agent, or Firm—Fleit, Jacobson, Cohn, Price, Holman & Stern

[57] ABSTRACT

A method for simultaneous collection of seismic data of shallow and deep targets, in which two seismic streamers are towed at different water depths (1 and 2 in FIG. 2), and only one acoustic source of seismic signals is used. The seismic data recorded by the different streamers are mixed in a subsequent processing step, seismic data being weighted before being mixed by a weight which is made dependent on the recorded two-way travel time for the respective streamers, so that data from one or several streamers located at the least water depth receive a weight which decreases with travel time, whereas data from a corresponding number of streamers of greater depths receive a weight which increases with travel time.

8 Claims, 3 Drawing Sheets

METHOD FOR SIMULTANEOUS COLLECTION OF SEISMIC DATA FROM SHALLOW AND DEEP TARGETS

BACKGROUND OF THE INVENTION

The invention relates to a method for simultaneous collection of seismic data from shallow and deep targets, wherein at least two seismic streamers are used, which are towed at different depths, and wherein only one acoustic source is used for the seismic signals.

Marine seismic data are generally collected by the aid of vessels which tow one or more acoustic sources, and one or more listening cables or seismic streamers. Sources and streamers are generally towed at a depth of 5-12 meters below the surface of the sea. A utilized acoustic source emits a pressure wave at regular intervals in time or space, for instance every ten seconds or every 25 meters. Upon passing through the crust of the Earth and being reflected back, the acoustic signals are detected in the seismic streamer. Said streamer is generally between 2 and 6 km long and typically comprises between 120 and 480 hydrophones or hydrophone arrays. Towing of the equipment through the water and movement of the water due to meteorological conditions will also cause acoustic noise to be recorded with seismic signals. It is well-known that noise due to wind and waves is especially bothersome when the seismic streamer is towed in shallow waters. Such noise is often a limiting factor as regards data quality, and it may cause interruption of the collection of seismic data under unfavorable conditions.

Furthermore, it is known that absorption in the crust of the Earth along the path of propagation of the acoustic signals or waves causes attenuation of especially high frequencies. This will in turn result in reflections from shallow targets having a larger proportion of high frequency components than reflections from targets at greater depths. The technique of data collecting is thus typically optimized with respect to one of the targets in the separate survey series. Interest may for instance be focused on a survey of shallow structures or on a survey of deep structures. The technique of collecting has to be adapted to the specific target which is the selected object of the survey. The depth of water in which measuring equipment is located, is a typical parameter which is adapted in consideration of the targets. This will be discussed in more detail below. When it is desirable to survey targets both in shallow waters and in deep waters at the same time, the collecting parameters will be objects of compromise.

The depth of the seismic source and of the streamer, in addition to the above-mentioned attenuation of the acoustic signal or absorption along the signal path of propagation, critically influences the frequency content of the recorded data. At the source some of the emitted energy will be reflected at the surface and will interfere with the remaining emitted waves. This will, in turn, cause some frequency components to be amplified and others to be attentuated, depending on the travel time from the source up to the surface and back again. This additional travel time causes some frequency components to interfere actively, i.e. they are in phase, whereas others interfere destructively, i.e. they are in antiphase. This effect will cause a sine-like modulation of frequency spectra with zero response at sine n for a frequency which is inversely proportional to the towing depth. Such an interference will also occur at the seismic streamer. In order to retain high frequency components from shallow targets right under the sea floor it is, thus, desirable to tow the acoustic source and the seismic streamer right below the surface of the sea. For deeper targets it will not be possible to attain such a high frequency due to the above-mentioned absorption along the propagation path of the signal. Consequently, in this case the equipment is towed at greater depth, which will yield lower frequencies and better acoustic penetration. At the same time, there will be less noise caused by weather conditions at greater depths, as mentioned above.

When it is desirable to survey only particularly shallow geological strata just below the sea floor at the same time as geological strata on more commonly surveyed greater depths, two sources and two seismic streamers are used. Such a method is disclosed in Norwegian Patent Application No. 83 2981 (Newman) filed Feb. 20, 1984. It is a disadvantage of that method that energy from both sources may disturb the recordings of the other. Especially, the source generally used at a deeper level may cause an increased level of noise in recordings of reflections from the weaker source on a shorter seismic streamer which is towed in shallow water. Methods for reducing or eliminating such problems are disclosed, for instance, in U.S. Pat. No. 3,744,021 (Todd). Due to the fact that the shallow additional source of sound is so weak, it may for instance comprise only a single water gun, and the shallow additional seismic streamer is so short, it will only be possible to achieve optimization when surveying very shallow strata just below the sea floor. It is also well-known that a weak acoustic source and a short seismic streamer are not suitable for surveys of deeper strata, for instance strata at depths corresponding to more than 1 second of travel time.

In connection with collecting seismic data by means of at least two seismic streamers, various recording techniques have been proposed, a special object of which was to increase recording capacity on the towing vessel. Such a recording technique is disclosed, for instance, in British Patent Specification No. 1,510,681 (Michon and Staron). As mentioned, there is also the problem of recordings of reflections from the weak source by the short seismic streamer in shallow waters. Methods were therefore proposed to remove such recordings, the so-called ghost effect. In U.S. Pat. No. 3,952,281 and U.S. Pat. No. 3,979,713 (Parrack) a method is proposed, in which recordings on one seismic streamer are delayed and subtracted from recordings on the other in order to eliminate recordings of ghost signals, i.e. downgoing waves. In case of such subtraction data quality is especially sensitive to any deviations of the vertical and horizontal position of the seismic streamers. Additionally, it may readily be demonstrated that the signal/noise ratio deteriorates.

Another method of removing ghost signals according to the above definition is disclosed in GB Patent Application No. 2 081 446 (Ray and Moore). It suggests the use of a seismic streamer having a depth as desired from typically 3 meters at the front end to typically 38 meters at the rear end. Two so-called NMO correction methods are used and are assumed to provide superior quality after summation. The disadvantage of the last-mentioned method is that it is very sensitive to the applied NMO correction which must be more accurate than common prior art and furthermore that noise is generated in the summation process before and after the reflection amplitudes which should be amplified during the summation. With the method proposed according to the last-mentioned application two seismic streamers are used. Combining recordings, an improved signal may be achieved and noise will be attenuated, since it is uncorrelated between the two seismic streamers.

BRIEF SUMMARY OF THE INVENTION

Disadvantages of known technology are that either the data collecting parameters for shallow or for deep targets must be optimized, or it is necessary to make a compromise resulting in a suboptimal data quality. In the method according to the present invention only a single source is used, which is good enough when simultaneous optimization is desired for two targets which both are at different depths just below the sea floor, for instance at depths corresponding to between 1 and 4 seconds of travel time. In the method according to the present invention subsequent data processing requires access to all recordings on both seismic streamers, so that an overlap of recordings, as disclosed in the above-mentioned British Patent Specification No. 1,510,681 is not desired.

It is an object of the method according to the invention to be able to optimize data collection in simultaneous surveys of several geological targets, which targets may be both at shallow and large depths. Another object is to reduce the effect of noise caused by unfavorable weather conditions and, thus, to increase productivity of the seismic survey.

The above objects are achieved by mixing the seismic data which were recorded by different streamers in a subsequent processing step, weighting the seismic data before they are mixed with a weight which is made dependent on the two-way travel time which was recorded for the respective streamers, so that data from the streamer or streamers at the least water depth receive a weight which decreases with travel time, whereas data from a corresponding number of streamers at a larger depth are weighted by a weight which increases with travel time. Further features and advantages will appear from the attached claims.

BRIEF DESCRIPTION OF THE DRAWINGS

The method according to the invention is disclosed in more detail below with reference to the accompanying drawings wherein.

DETAILED DESCRIPTION

Figure 1:
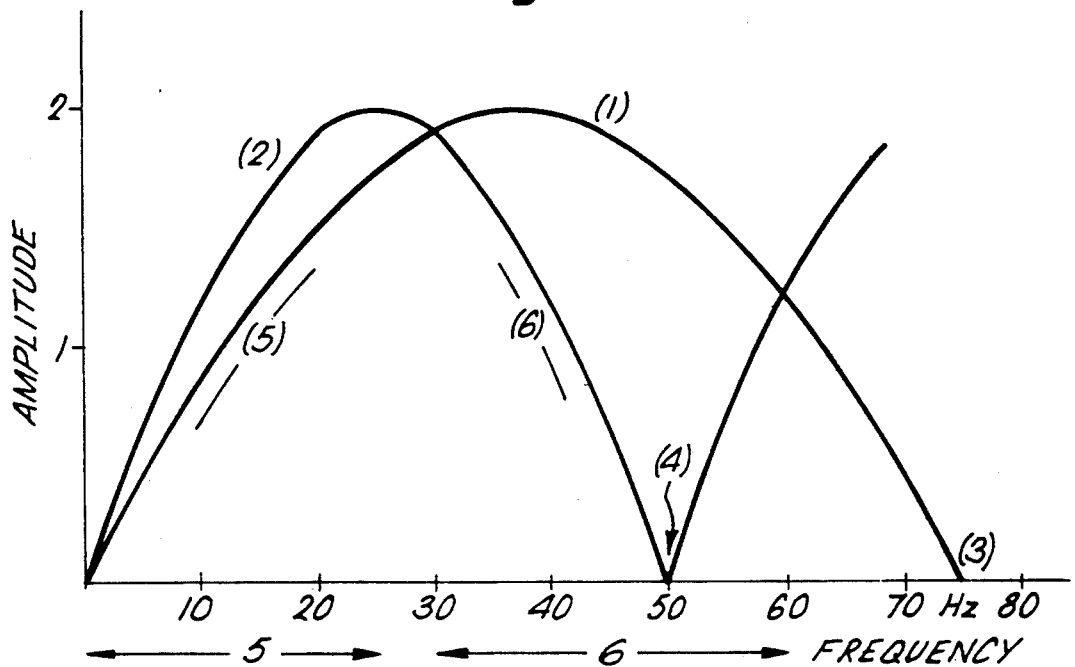
FIG. 1 shows the modulation curves of two listening streamers according to present technology.

FIG. 1 is a diagrammatical view of what can be achieved with known technology, 1 designating the modulation curves of a seismic streamer at a depth of 10 meters, and 2 designating the modulation curve of a seismic streamer at a depth of 15 meters. The ghost frequency is the frequency where there is zero response. It is indicated at 3 in the Figure, i.e. 75 Hz for curve 1, and at 4, i.e. 50 Hz for curve 2. It also appears from FIG. 1 how the shallow seismic streamer attenuates low frequency components 5 more than the deep streamer which attenuates high frequency components 6 to a higher degree.

Figure 2:
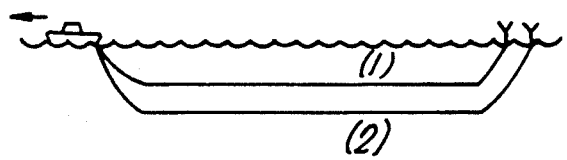
FIG. 2 shows how two or a plurality of listening streamers are towed at different depths with the method according to the invention.

In the method according to the invention two or more seismic streamers are towed at different depths, as shown in FIG. 2. The shallow streamer 1 produces data on shallow targets, and the deep streamer produces data on deep targets. The depth of the streamer is determined on the basis of well-known properties related to the towing depth of the streamer and diagrammatically indicated in FIG. 1, and on the basis of the frequencies which desirably are emphasized for each of various defined geological targets. A typical depth of the shallow streamer may be between 5 and 10 meters, and a typical depth of the deep streamer may be between 10 and 20 meters.

The seismic streamers should preferably have the same length and the same distance from the source. However, it may be desired to move the deeper streamer rearwards or use a longer streamer for certain objects. The distance between hydrophone arrays is preferably the same in both streamers in order to simplify subsequent processing of the data. The horizontal position of the streamers is determined by known techniques, for instance by use of magnetic compasses or acoustic transponders which are mounted in the streamers. Each streamer is towed at a fixed depth which is monitored by bathymeters and is controlled by a depth control system, so-called birds, which are well-known in the Art.

With the method according to the present invention only a single acoustic source is to be used. This is more than enough, since two or more geological targets will be at depths which preclude use of a weak source for the uppermost (most shallow) target due to resulting penetration problems. Also they do not necessitate adaption of the frequency content of the source signature, since much higher frequencies cannot be expected from more shallow targets as compared to deeper targets, something which however might be assumed when the shallow target is right below the sea floor as was supposed in Norwegian Patent Application No. 83 2981, due to absorption along the path of propagation through the crust of the Earth to the more shallow target. On the whole, this provides a considerable simplification as compared to the known methods mentioned above.

Figure 3:
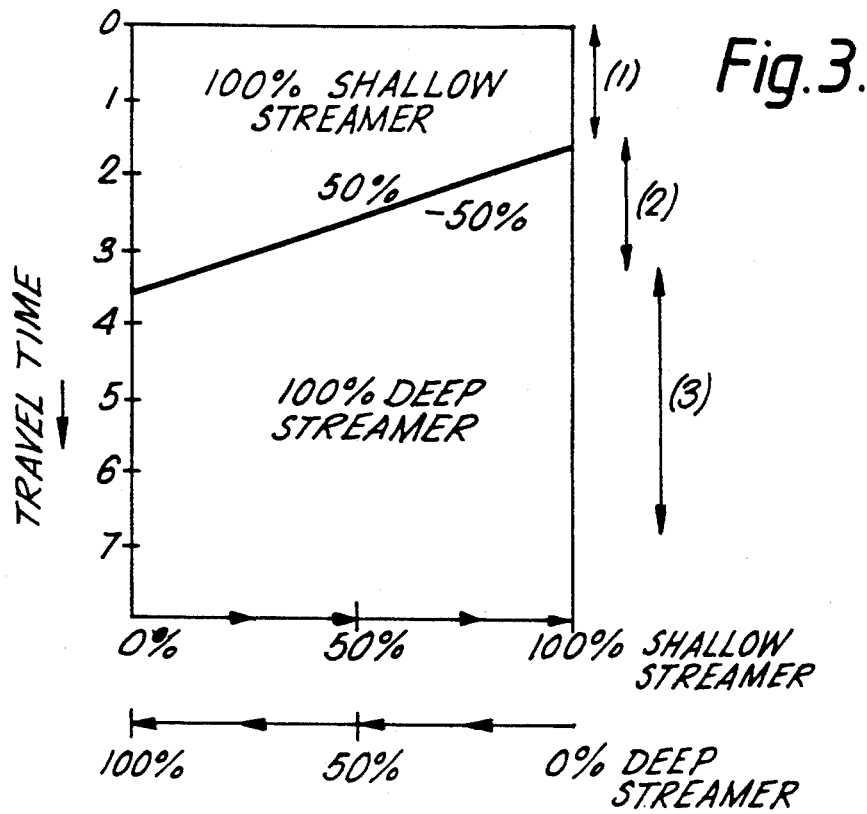
FIG. 3 is a diagrammatical view of subsequent processing of the seismic data according to the present invention.
Figure 4:
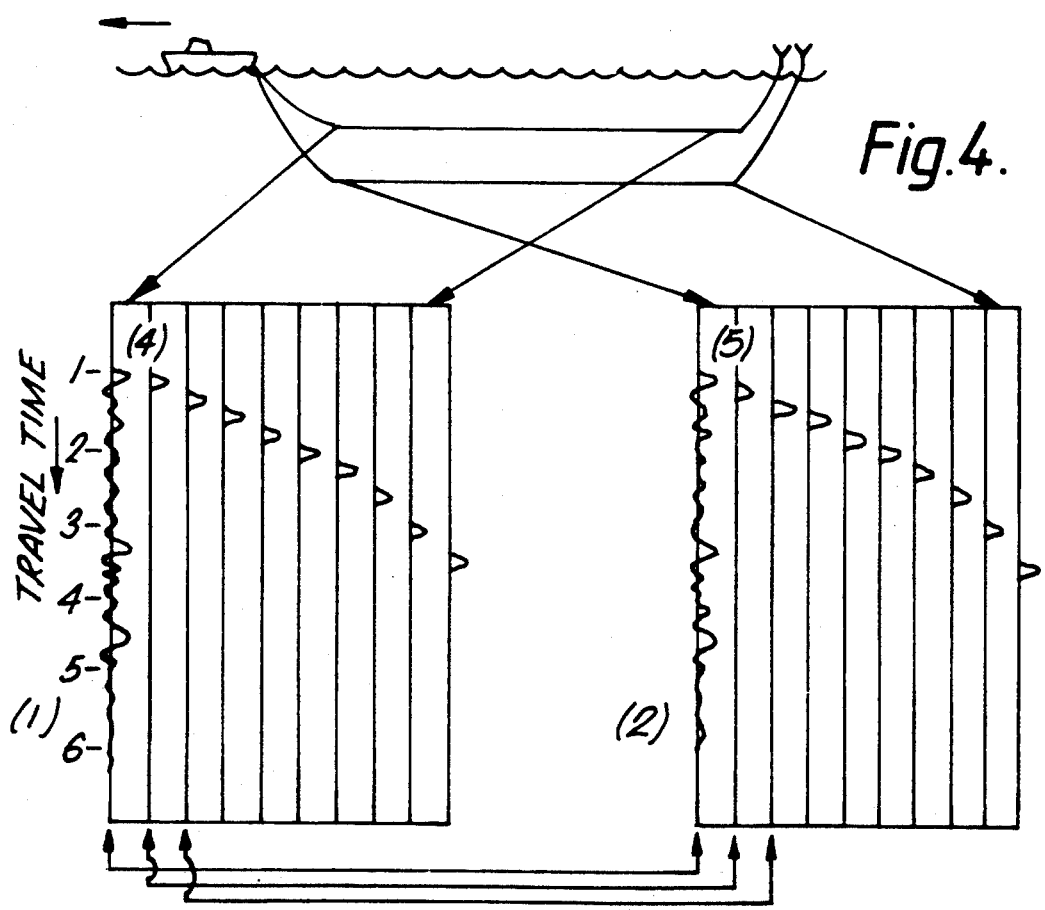
FIG. 4 is a diagrammatical view of the recordings of seismic data in two seismic streamers.

FIG. 3 shows how data are mixed after processing so that data from the shallow streamer contribute with 100% at a certain two-way travelling time, whereas data from the deeper streamer contribute with a relatively increasing weight 2 at longer travelling times, and that only data from the deeper streamer contribute at a still longer two-way travel time 3. The travel times which determine the mixing may be made dependent on travel times to particular geological structures and following them along the seismic profile. Mixing may be carried out anywhere in the subsequent processing sequence upon correction of the recordings to a certain plane of reference, for instance the surface of the sea. The most natural points of time for said mixing are at the beginning of the subsequent processing, i.e. right after the above-mentioned correction to a plane of reference or after so-called CDP-stack, which is a method well-known to those skilled in the Art of seismic data processing. Upon firing a source of sound, measurements are made simultaeously by the aid of both seismic streamers which are designated 1, and 2, respectively in FIG. 4. The number of recordings in each seismic streamer, obviously, depends on the number of hydrophones or hydrophone arrays used in each seismic streamer. Series of measurements caused by the same shot are summed together. This is done in such a manner that recordings of one particular hydrophone or hydrophone array 4 on one streamer are mixed with those having the same distance to the source on the other streamer 5. In this manner all recordings having the same distance to the acoustic source are mixed. Mixing is carried out with the aid of weights which are a function of recording time, as stated above. Data 6 which are obtained in this manner, may now be regarded as improved field recordings, and may be input for subsequent conventional data processing. It is essential that only recordings having the same distance between source and measuring point are mixed.

Figure 5C:
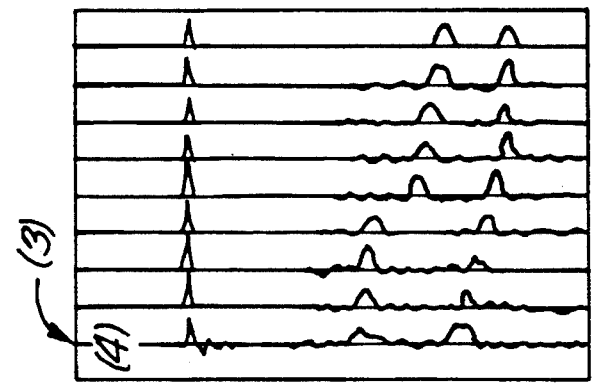
FIGS. 5a, 5b and 5c are diagrammatical views of time series of recorded data of one surface point, as well as occurring noise.
Figure 5B:
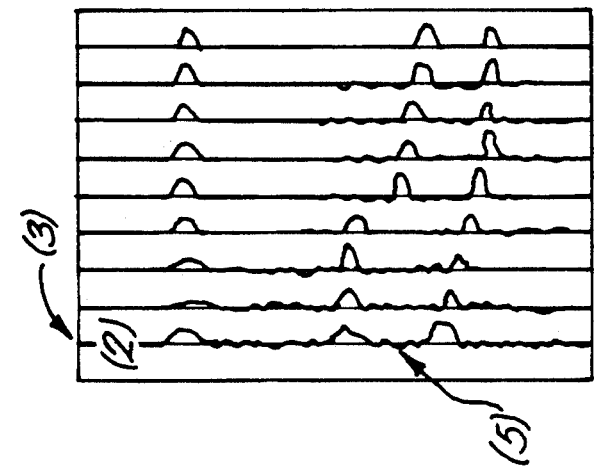
Figure 5A:
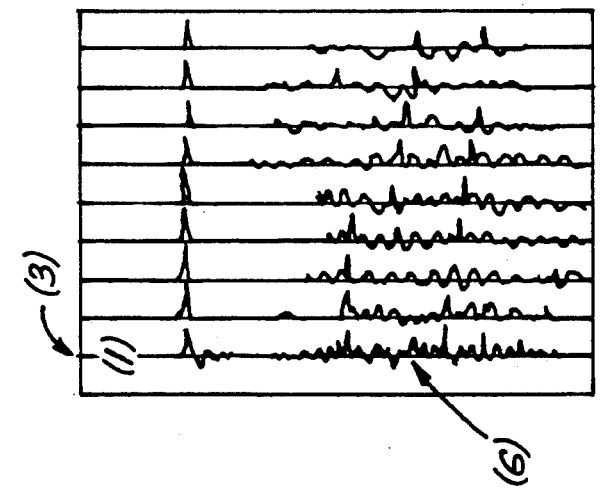

Alternatively, mixing may be carried out later in the processing sequence after a process called stacking, which is well-known to those skilled in the Art of seismic data processing. During stacking the amount of data is reduced to only a single time series for each surface point and travel time is corrected to compensate for the horizontal distance between source and receiver. With the method according to the invention there will be two time series 1 and 2 for each surface point, i.e. one from each seismic streamer, as shown in FIGS. 5a and 5b. These two series are mixed into a new time series 4 as shown in FIG. 5c. This is repeated for all surface points along the seismic profile. Mixing is carried out by the aid of weights as a function of recording time, as disclosed above. It will also appear from FIGS. 5a, 5b and 5c how data-quality may be improved. Time series 1 has a plurality of high frequency components and is especially suitable for mapping structures at a depth corresponding to a travel time of 1–2 seconds. At larger depths this recording shows a poorer signal/noise ratio. Time series 2 has a higher content of low frequency components and is especially suitable for surveying structures at a depth corresponding to a travel time of 3–4 seconds. Due to shallow depths this recording will show few details. A mixed time series 4 will maintain the best recordings of both time series 1 and 2, as mentioned above.

In a further development of this method more than two streamers may be utilized on more than two depths with a corresponding adaption of the mixing ratio as a function of two-way travel time. A special example of such a further development is the situation when a mini-streamer is towed in very shallow waters together with two conventional seismic streamers at different depths. Such a mini-streamer is generally used for technical surveys of the sea floor proper or the area just below the sea floor and is for instance discussed in some of the above-mentioned publications.

When two or more data streamers are used, the generated two or more data sets may, additionally, be used for wave field separation, as disclosed in U.S. Pat. No. 3,952,281. In such subsequent mixing the effect of the streamer depth may be completely removed enabling increased resolution or accuracy. Wave separation of this kind will, in case, only be used in a time window located right at the beginning of recording time, because the value of an improved resolution by this method is especially relevant for shallow targets, where there are still high frequency components due to a shorter path of propagation and correspondingly low absorption, etc. For reflections from great depths it would serve no useful purpose to amplify high frequency components, since they do not occur, as mentioned above. The method of wave field separation, however, is not within the scope of the present application; it was just mentioned to indicate further possibilities of the method according to the invention.

According to the method disclosed in British Patent Specification No. 2,081,446 hydrophone arrays being towed at shallow depths and located closest to the source, could be used for shallow targets and hydrophone arrays located further away and being towed at greater depths could be used for deep targets. This special utilization, however, has the disadvantage as compared to the present invention that the amount of data from each point of reflection is reduced, dependent on whether near or distant hydrophone arrays are used for various geological targets. Processing with the method according to the present invention is always done with maximum amount of data, i.e. the same number of hydrophone arrays as on a seismic streamer and which would otherwise be used in conventional data collection. The sum of the mix of recordings on both streamers is, after all, always 100%. Consequently, improved attenuation of arbitrary or shot generated noise is achieved.

Another advantage which is achieved by utilizing the method according to the invention is that reflections from deep strata are only used in the shape in which they are recorded on the deep streamer. As shown in FIG. 5b, the noise level 5 on the deep streamer is generally lower under unfavorable weather conditions than on a more shallow streamer. There is however a more pronounced increase of the noise level 6 (FIG. 5a) in the shallow streamer under such conditions, but this streamer primarily contributes to recording shallow reflections which have higher amplitudes due to the fact that there is less absorption and there is also less attenuation of the amplitude along the path of propagation. In case of worsening unfavorable weather conditions the signal/noise ratio of recording depths assigned to the respective streamers will, consequently stay at an acceptable level for a longer time than with prior art, and this will in turn increase the productivity of seismic surveys.

We claim:

1. In a method for simultaneous collection of seismic data of shallow and deep targets, wherein at least two seismic streamers are towed by a vessel at a different water depth, and only one acoustic source for the seismic signals is used, the improvement comprising:

weighting seismic data recorded by different seismic streamers with a weight which is made dependent on two-way travel time recorded by the respective steamers so that data from at least one streamer positioned at the least water depth receives a weight decreasing with travel time, and data from a corresponding number of streamers at a greater water depth receive a weight increasing with travel time; and mixing said seismic data from said different seismic streamers.

2. A method as claimed in claim 1, and further comprising:

relating and associating said two-way travel time with a certain geological structure.

3. A method as claimed in claim 1, and further comprising:
correcting said recorded seismic data to a plane of reference before said mixing.

4. A method as claimed in claim 3, and further comprising:
carrying out said mixing immediately after said correcting to the plane of reference.

5. A method as claimed in claim 1, and further comprising:
after said weighting and before said mixing stacking said data to reduce the amount of data recorded by a streamer to only one time series for each surface point.

6. A method as claimed in claim 4, and further comprising:
relating and associating said two-way travel time with a certain geological structure.

7. A method as claimed in claim 2, and further comprising:
after said weighting and before said mixing stacking said data to reduce the amount of data recorded by a streamer to only one time series for each surface point.

8. A method as claimed in claim 3, and further comprising:
after said weighting and before said mixing stacking said data to reduce the amount of data recorded by a streamer to only one time series for each surface point.

* * * * *